United States Patent [19]
Lambert et al.

[11] Patent Number: 6,089,662
[45] Date of Patent: Jul. 18, 2000

[54] CHILD RESTRAINT SEAT ASSEMBLY

[75] Inventors: Jeffrey T. Lambert, Commerce Township; Kermit T. Henson, Westland; Alan Mackey, Lion, all of Mich.

[73] Assignee: Magna Interior Systems, Inc., Aurora, Canada

[21] Appl. No.: 09/212,920

[22] Filed: Dec. 16, 1998

Related U.S. Application Data

[60] Provisional application No. 60/069,777, Dec. 16, 1997.

[51] Int. Cl.$^7$ ................................................. A47C 15/00
[52] U.S. Cl. ............................................. 297/238; 297/484
[58] Field of Search .................................. 297/238, 467, 297/480, 484

[56] References Cited

U.S. PATENT DOCUMENTS

| | | |
|---|---|---|
| Re. 29,841 | 11/1978 | Werner . |
| 3,934,934 | 1/1976 | Farrell, Jr. et al. . |
| 4,186,961 | 2/1980 | Farrell, Jr. et al. . |
| 4,402,548 | 9/1983 | Mason . |
| 4,429,916 | 2/1984 | Hyde et al. . |
| 4,679,852 | 7/1987 | Anthony et al. . |
| 4,891,454 | 1/1990 | Perdelwitz, Jr. et al. . |
| 4,900,087 | 2/1990 | Crisp . |
| 5,031,962 | 7/1991 | Lee . |
| 5,061,012 | 10/1991 | Parker et al. . |
| 5,160,186 | 11/1992 | Lee . |
| 5,224,756 | 7/1993 | Dukatz et al. . |
| 5,280,995 | 1/1994 | Elton . |
| 5,282,667 | 2/1994 | Elton et al. . |
| 5,286,090 | 2/1994 | Templin et al. . |
| 5,292,176 | 3/1994 | Artz . |
| 5,364,169 | 11/1994 | Collins et al. . |
| 5,366,271 | 11/1994 | Johnston et al. . |
| 5,380,067 | 1/1995 | Turvill et al. . |
| 5,385,384 | 1/1995 | Gierman et al. . |
| 5,398,997 | 3/1995 | McFalls .............................. 297/484 X |
| 5,449,216 | 9/1995 | Gierman et al. . |
| 5,449,223 | 9/1995 | Miculici et al. ..................... 297/238 X |
| 5,466,043 | 11/1995 | Lambert et al. . |
| 5,468,046 | 11/1995 | Weber et al. ....................... 297/484 X |
| 5,472,260 | 12/1995 | Czapski et al. . |
| 5,496,092 | 3/1996 | Williams et al. . |
| 5,503,461 | 4/1996 | Schreier . |
| 5,511,856 | 4/1996 | Merrick et al. . |
| 5,529,381 | 6/1996 | Zhao et al. . |
| 5,570,932 | 11/1996 | Collins et al. ...................... 297/238 X |
| 5,580,126 | 12/1996 | Sedlack . |
| 5,603,550 | 2/1997 | Holdampf et al. ...................... 297/238 |
| 5,605,375 | 2/1997 | Friedrich et al. . |
| 5,611,603 | 3/1997 | Gray et al. .......................... 297/238 X |
| 5,639,144 | 6/1997 | Naujokas . |
| 5,653,504 | 8/1997 | Henson . |
| 5,704,684 | 1/1998 | Dukatz et al. . |
| 5,716,097 | 2/1998 | Peck et al. . |

FOREIGN PATENT DOCUMENTS

| | | |
|---|---|---|
| 1012050 | 6/1977 | Canada . |
| 0295838A1 | 12/1988 | European Pat. Off. . |
| 0609889A1 | 8/1994 | European Pat. Off. . |
| 2277863 | 11/1994 | United Kingdom . |
| WO8602050 | 4/1986 | WIPO . |

OTHER PUBLICATIONS

PCT Search Report, International Application No. PCT,CA 98/01148, International Filing Date, Dec. 16, 1998.
PCT International Application, International Publication No. WO 86/02050, International Publication Date, Apr. 10, 1986.

*Primary Examiner*—Peter M. Cuomo
*Assistant Examiner*—Stephen Vu
*Attorney, Agent, or Firm*—Howard & Howard

[57] ABSTRACT

A child restraint seat assembly integral with a passenger seat in a vehicle. The child seat includes a back support constructed and arranged to support a torso of a child in a seated posture. A bottom support is pivotally mounted to the back support and moveable between a stowed position and a deployed position for supporting the child in the seated posture when in the deployed position. A pair of shoulder belts extend over the back support and are constructed and arranged to secure the torso of the child to the back support. A pair of lap belts extend over the bottom support and are constructed and arranged to secure a lap region of the child. A crotch belt is integrally connected to the lap belts and extends upwardly from the bottom support for locking engagement with the shoulder belts. The assembly is characterized by a retarding device integrally formed within the bottom support and engaging the crotch belt for limiting movement of the crotch belt and the lap belts relative to the bottom support to ensure a proper fitting relationship between the belts and the child.

14 Claims, 5 Drawing Sheets

CHILD RESTRAINT SEAT ASSEMBLY

RELATED APPLICATION

This application claims priority to and all the benefits of U.S. Provisional Patent Application No. 60/069,777, filed on Dec. 16, 1997 and entitled "Child Restraint Seat Safety Belt Assembly".

BACKGROUND OF THE INVENTION

1) Technical Field

The subject invention relates to a seat belt restraint system for an integral automotive child seat.

2) Description of the Prior Art

Integral automotive child restraint seats are well known in the art. These child seats have a seat belt restraint system which typically includes a pair of shoulder belts, a pair of lap belts and a crotch belt. Examples of integral child seats are shown in U.S. Pat. Nos. 5,449,216; 5,466,043; 5,472,260; 5,653,504; and 5,704,684. Many integral child seat designs have separate lap belts, shoulder belts and crotch belt which are all mounted to the child seat at different mounting points. Some designs, however, have the lap belts integrally connected to the crotch belt underneath the child seat such that movement of the crotch belt will move the lap belts and vise versa. A deficiency with this design is that the lap and crotch belts may be inadvertently moved into an unsafe position. In other words, the lap belts and/or crotch belt may be moved to a position that does not correctly protect and restrain the child. Hence, it is desirable to have a device which automatically maintains the proper positioning of the lap and crotch belts.

SUMMARY OF THE INVENTION AND ADVANTAGES

A child restraint seat assembly integral with a passenger seat in a vehicle. The assembly comprises a back support constructed and arranged to support a torso of a child in a seated posture. A bottom support is pivotally mounted to the back support and moveable between a stowed position and a deployed position for supporting the child in the seated posture when in the deployed position. A pair of shoulder belts each extend over the back support and are constructed and arranged to secure the torso of the child to the back support. A pair of lap belts each extend over the bottom support and are constructed and arranged to secure a lap region of the child. A crotch belt is integrally connected to the lap belts and extending upwardly from the bottom support for locking engagement with the shoulder belts. The assembly is characterized by a retarding device disposed on the bottom support and engaging at least one of the crotch and lap belts for limiting movement of the crotch belt and the lap belts relative to the bottom support to ensure a proper fitting relationship between the belts and the child.

Accordingly, the subject invention incorporates a retarding device to maintain the proper positioning of the lap belts and crotch belt such that the lap and crotch belts may not be moved into a position that does not correctly protect and restrain the child.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
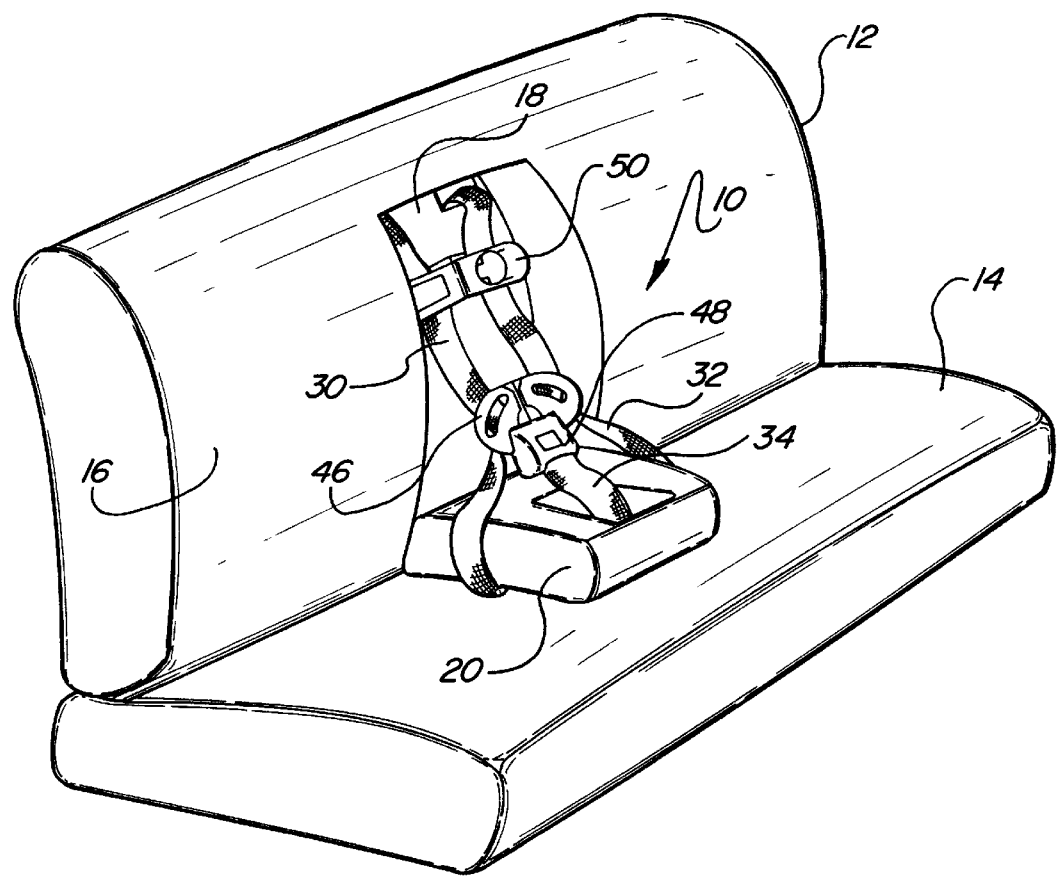
FIG. 1 is a perspective view of a child restraint seat assembly integral with a passenger seat in vehicle.

Referring to the Figures, wherein like numerals indicate like or corresponding parts throughout the several views, a child restraint seat assembly integral with a passenger seat 12 in a vehicle (not shown) is generally shown at 10 in FIG. 1. The passenger seat 12 is illustrated as a bench-type vehicle seat which includes an adult seat cushion 14 and an adult seat back 16. As appreciated, the child restraint seat assembly 10 may be incorporated into any type of suitable seat design.

The child restraint seat assembly 10 includes a child seat back 18, which is mounted within the adult seat back 16 of the passenger seat 12. The child seat assembly 10 also includes a child seat cushion 20 which is pivotally moveable between a stowed position wherein the child seat cushion 20 is disposed substantially flush with the adult seat back 16 and a deployed position wherein the child seat cushion 20 is disposed overlying the adult seat cushion 14. Both the child seat cushion 20 and child seat back 18 are covered by a suitable foam pad and trim cover material (not numbered) as is known in the art. The foam pad and trim cover material may be removable for ease in cleaning the child seat assembly 10.

Figure 2:
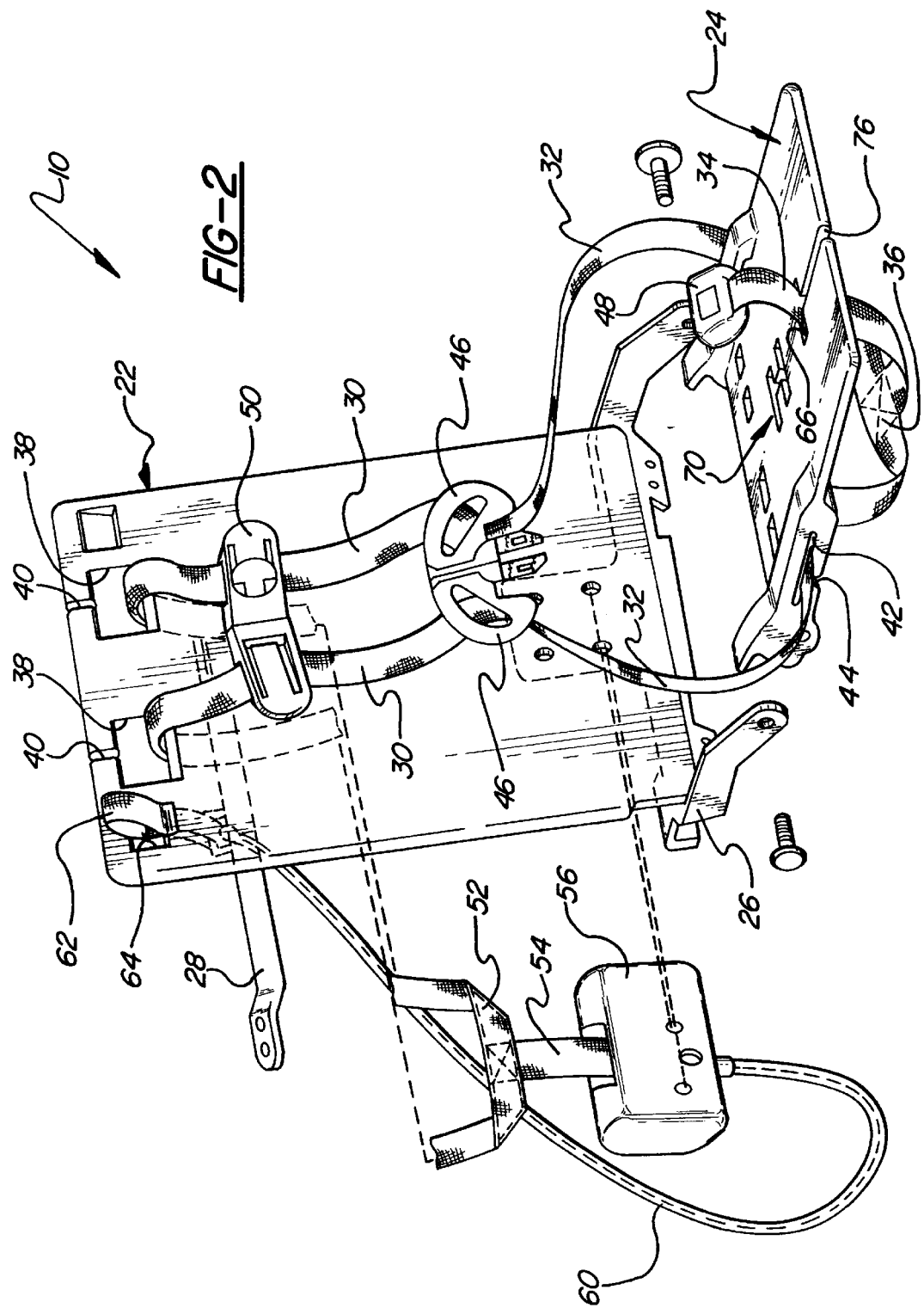
FIG. 2 is a perspective view of the child restraint seat assembly with the trim cover material removed therefrom.
Figure 3:
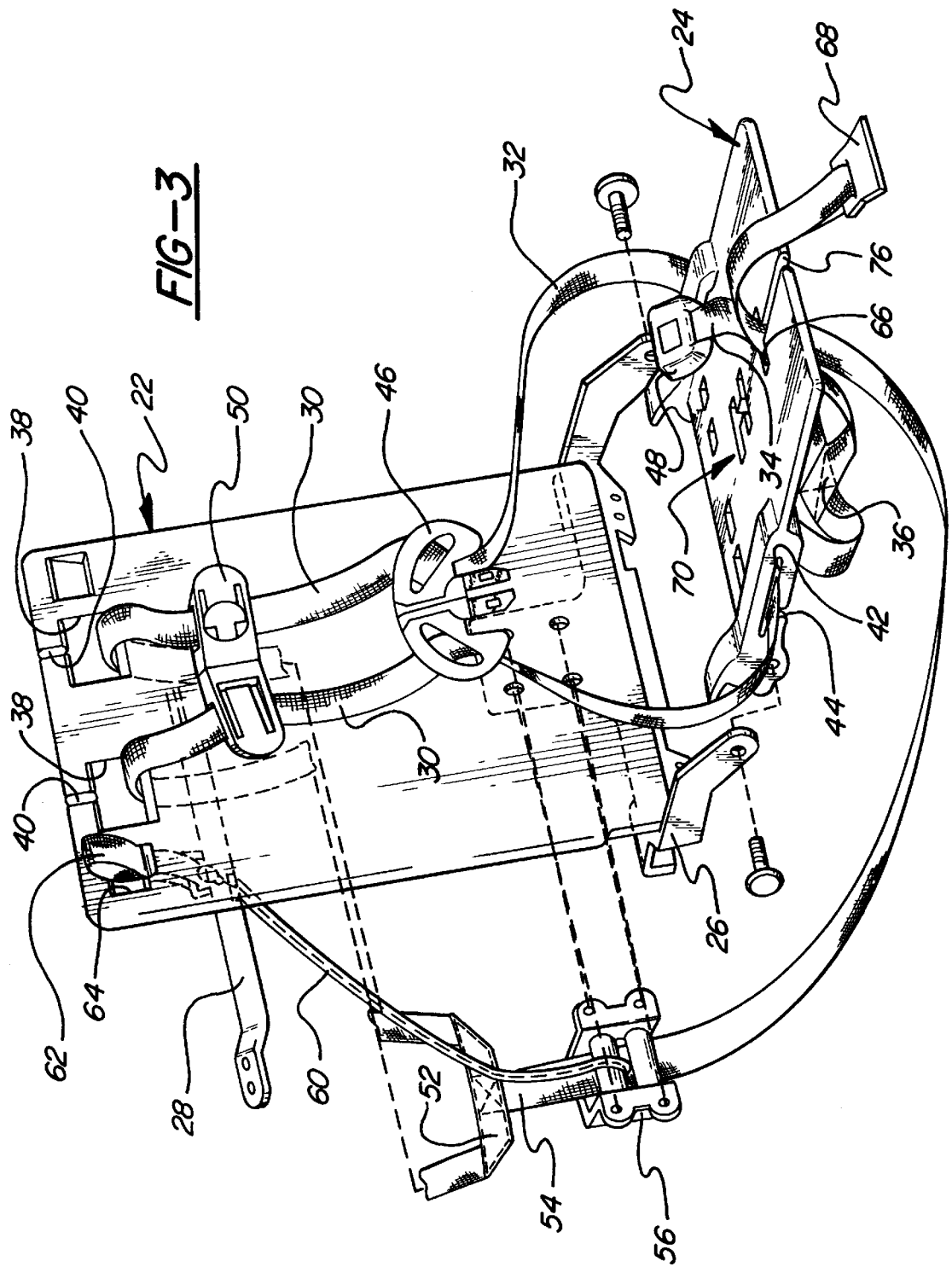
FIG. 3 is a perspective view of the child restraint seat assembly shown in FIG. 2 with an alternative retractor mechanism.

Referring more particularly to FIGS. 2 and 3, the child restraint seat assembly 10 comprises a back support 22 constructed and arranged to support a torso of a child (not shown) in a seated posture. The assembly 10 also comprises a bottom support 24 pivotally mounted to the back support 22 and moveable between the stowed position and the deployed position for supporting the child in the seated posture when in the deployed position. The back support 22 and the bottom support 24 are the structural members which form the child seat back 18 and child seat cushion 20, respectively. A lower mounting bracket 26 extends from the back support 22 for pivotally mounting the bottom support 24 thereto. The back support 22 is secured to the passenger seat 12 by an upper mounting bracket 28 and the lower mounting bracket 26. The back support 22 and bottom support 24 are preferably molded from a suitable structural plastic material as is known in the art.

A pair of shoulder belts 30 each extend over the back support 22 and are constructed and arranged to secure the torso of the child to the back support 22. A pair of lap belts 32 each extend over the bottom support 24 and are constructed and arranged to secure a lap region of the child. The lap region of the child typically includes the waist and thigh of the child. A crotch belt 34 is integrally connected to the lap belts 32 and extends upwardly from the bottom support 24 for locking engagement with the shoulder belts 30. Specifically, one of the distal ends of the crotch belt 34 is firmly stitched to a mid section 36 of the lap belts 32. The shoulder belts 30, lap belts 32, and crotch belt 34 form a seat belt restraint system for the integral child seat assembly 10.

The back support 22 includes a pair of top apertures 38 with the shoulder belts 30 passing therethrough. A pair of top slots 40 mate with the top apertures 38 in the back support 22 for providing access to the top apertures 38 such that the shoulder belts 30 may be installed within the top apertures 38. The top apertures 38 are relatively large which increases the range of angles for which the shoulder belts 30 can extend thereby accommodating a wider size range of children. Similarly, the bottom support 24 includes a pair of side apertures 42 with the lap belts 32 passing therethrough. A pair of side slots 44 mate with the side apertures 42 of the bottom support 24 for providing access to the side apertures 42 such that the lap belts 32 may be installed within the side apertures 42.

The pair of shoulder belts 30 include a right shoulder belt 30 and a left shoulder belt 30 and the pair of lap belts 32 similarly include a right lap belt 32 and a left lap belt 32. Preferably, the right shoulder belt 30 and the right lap belt 32 are interconnected to form one continuous right seat belt and the left shoulder belt 30 and the left lap belt 32 are interconnected to form one continuous left seat belt. For illustrative purposes, the right and left seat belts are numbered as the separate shoulder 30 and lap 32 belt portions. As appreciated, the lap belts 32 and shoulder belts 30 could be separated without deviating from the overall scope of the subject invention.

A latch 46 is mounted to each of the right and left seat belts at the interface of the corresponding shoulder 30 and lap belts 32. A buckle 48 disposed on a distal end of the crotch belt 34 for selective engagement with the latches 46 to secure the shoulder 30 and the lap 32 belts to the crotch belt 34. The latch 46 is of a type which includes two separate parts that are joined together when the latch 46 is latched to the buckle 48 as is known in the art.

A shoulder belt clip 50 is mounted to each of the shoulder belts 30 between the latch 46 and the top apertures 38 in the back support 22 for maintaining the shoulder belts 30 in a substantially parallel configuration. Shoulder belt clips 50 of this type are also well known in the art.

Figure 5:
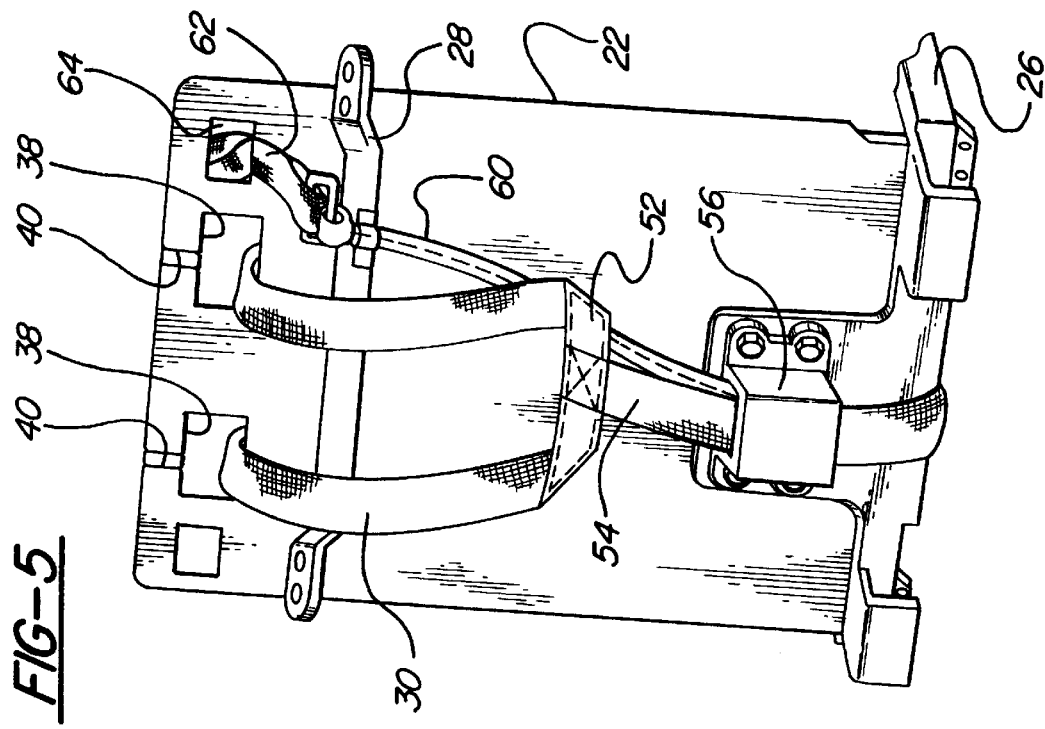
FIG. 5 is a perspective view of the back of the child restraint seat assembly of FIG. 3.
Figure 4:
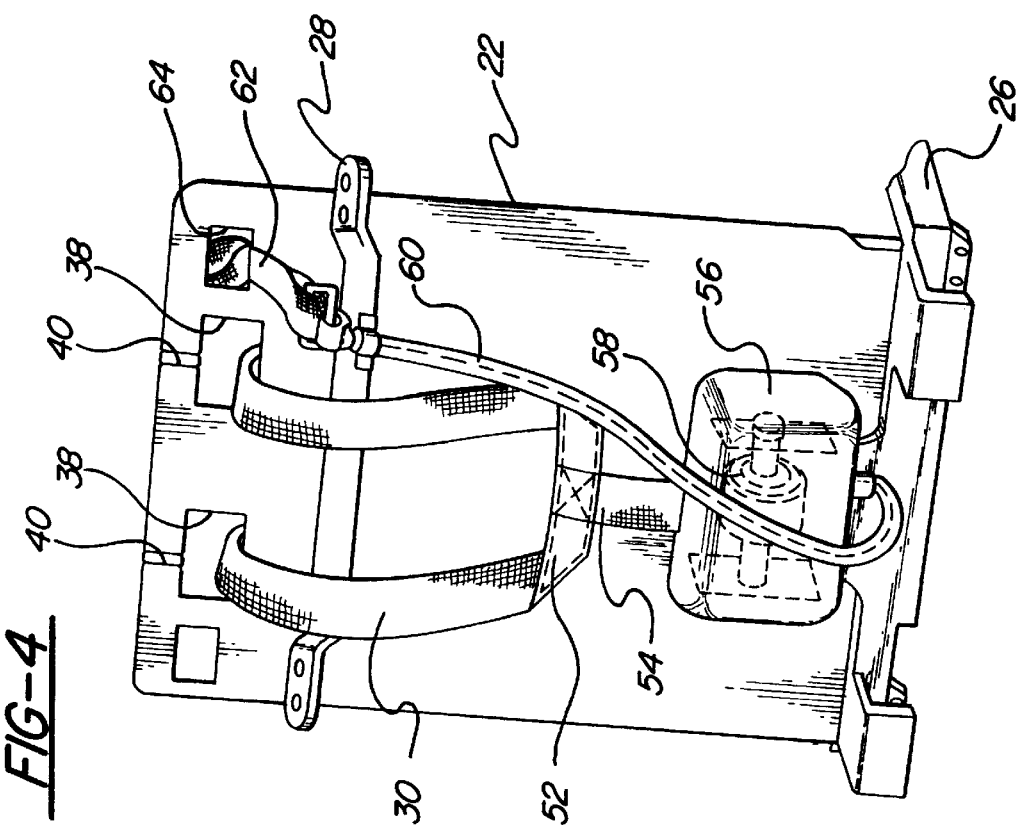
FIG. 4 is a perspective view of the back of the child restraint seat assembly of FIG. 2.

Referring to FIGS. 4 and 5, the shoulder belts 30 extend through their corresponding top apertures 38 and extend downwardly behind the back support 22. The two shoulder belts 30 are integrally transitioned into one another at a laterally extending belt portion 52. The transitioning lateral belt portion 52 is reinforced to maintain the configuration shown by being firmly stitched to a horizontally disposed rigid plastic member (not numbered). A retractor strap 54 has one end stitched to the lateral belt portion 52 and has an opposite end received in a safety belt retractor mechanism 56.

There are two contemplated embodiments of the safety belt retractor mechanism 56. The preferred embodiment incorporates an automatic retractor 56 as shown in FIGS. 2 and 4. An alternative embodiment incorporates a manually actuated cinch type retractor 56 as shown in FIGS. 3 and 5. Either retractor mechanism 56 is mounted by suitable fasteners on the back support 22 and particularly to the lower mounting bracket 26.

Referring more particularly to the automatic retractor 56 as shown in FIGS. 2 and 4, it can be appreciated that the retractor strap 54 is wound around a rotatable reel 58. The reel 58 is rotatable in a conventional fashion in opposite directions about its own axis to effectuate pay-out and take-up of retractor strap 54. Particularly, the retractor 56 permits pay-out of the retractor strap 54 when actuating a release strap 62. Otherwise, the retractor 56 locks the retractor strap 54 in place. A Bowden wire 60 extends from the retractor 56 to the release strap 62 extending through an opening 64 located in an upper left hand corner of the back support 22. A cable runs throughout the length of the Bowden wire 60. One end of cable is attached by suitable means to the release strap 62. The cable in turn extends forwardly through the opening 64 in back support 22 so that it is easily accessible to an adult user to release the associated retractor 56 and enable pay-out of retractor strap 54 for facilitating removal of the child from the child seat assembly 10. The release strap 62 is designed with an end portion of the material doubled over and stitched to form a loop to facilitate manual engagement. It can be appreciated from the drawings that placement of the loop of release strap 62 can be in either upper left corner of the back support 22 as shown or through another opening in the right hand corner of the back support 22.

Referring now more particularly to the manually operated retractor 56 as shown in FIGS. 3 and 5, the retractor strap 54 extends downwardly from the lateral belt portion 52. The strap 54 extends through the manually actuated retractor mechanism 56, and, as shown best in FIG. 3, further extends forwardly under the seat bottom and is drawn upwardly through a front aperture 66 in the seat bottom. At the end of the retractor strap 54 is disposed a grip piece 68. It can be seen that the manually actuatable retractor 56 receives the retractor strap 54 in conventional fashion. When the strap 54 is pulled by the grip end 68, the strap 54 will be ratcheted by the retractor 56 so as to tighten the shoulder belts 30 in restraining relation over the torso of the child. The retractor 56 will release its grip on the retractor strap 54 only upon pulling on retractor strap 54.

Figure 6:
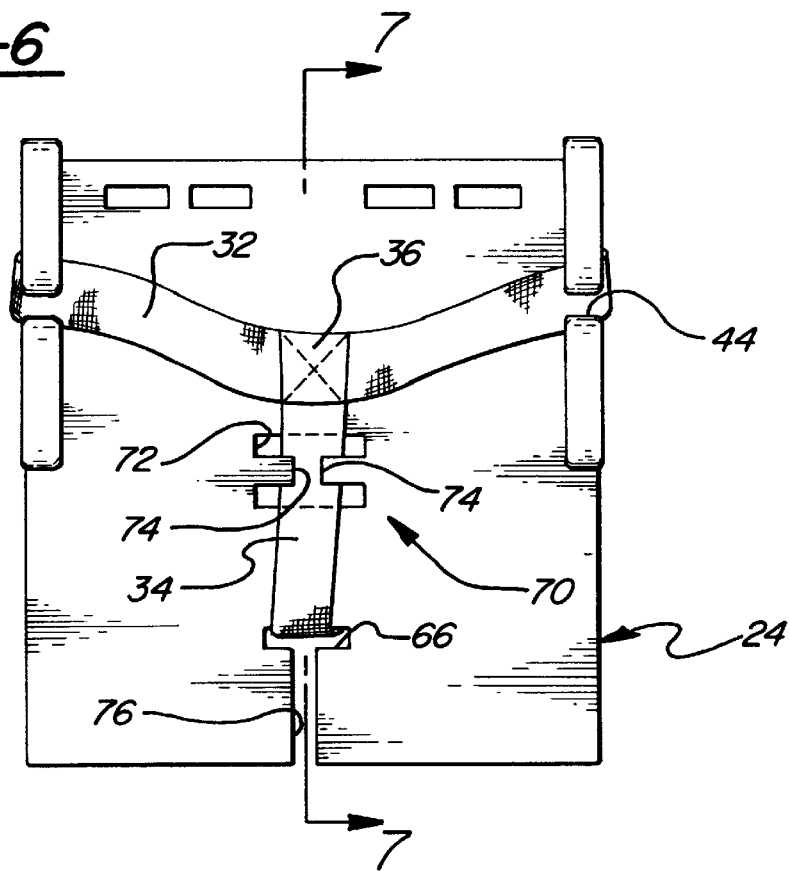
FIG. 6 is a bottom view of the child restraint seat assembly of FIG. 2.
Figure 7:
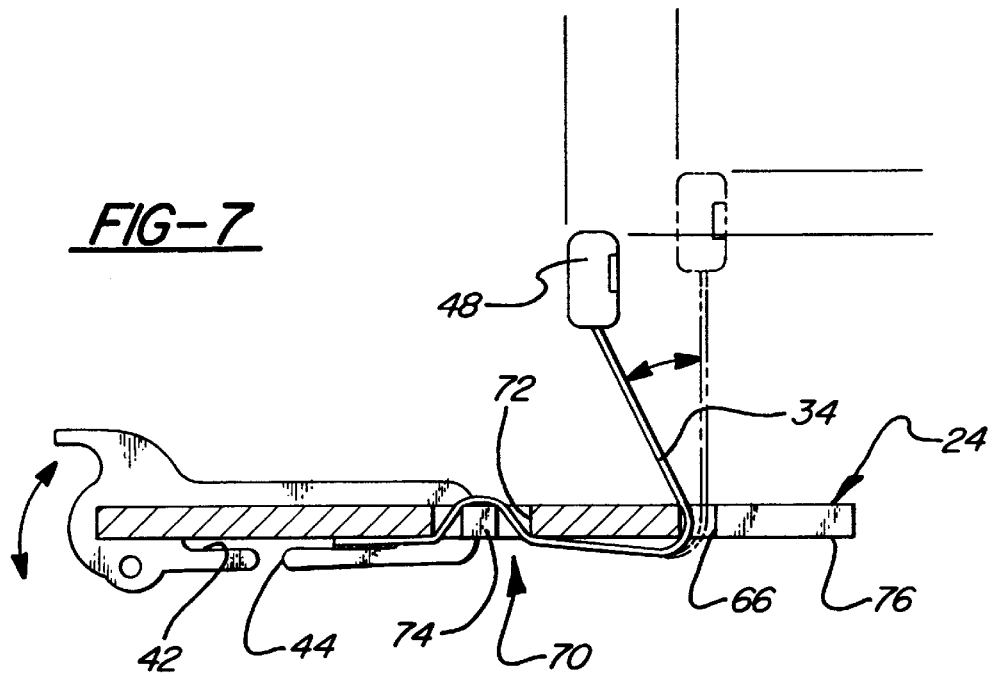
FIG. 7 is a cross-sectional view taken along line 7—7 of FIG. 6.

Referring to back to FIGS. 2 and 3, and also to FIGS. 6 and 7, the assembly 10 is characterized by a retarding device 70 disposed on the bottom support 24 and engaging at least one of the crotch 34 and lap 32 belts for limiting movement of the crotch belt 34 and the lap 32 belts relative to the bottom support 24 to ensure a proper fitting relationship between the belts 30, 32, 34 and the child. Preferably, the crotch belt 34 engages the retarding device 70 to limit the movement of the crotch belt 34 and the lap belts 32 relative to the bottom support 24. In other words, the relative movement of the three belts 30, 32, 34 is limited by the retarding device 70 such that the child will always be properly restrained within the child restraint seat assembly 10. As appreciated, the lap belts 32 may engage one or more retarding devices without deviating from the overall scope of the subject invention.

As shown best in FIGS. 6 and 7, the crotch belt 34 loops through the retarding device 70 such that the frictional forces between the crotch belt 34 and the retarding device 70 limit the movement of the crotch belt 34. The retarding device 70 is designed to stabilize and restrict movement of the crotch belt 34 and lap belts 32. Preferably, the retarding device 70 is integral with the bottom support 24. The bottom support 24 has a frontal section and a mid section with an opening 72 disposed in the mid section. The retarding device 70 includes a pair of integral flanges 74 extending into the opening 72 with the crotch belt 34 looping around the flanges 74. The opening 72 and flanges 74 create a generally H-shaped configuration. As appreciated, the retarding device 70 may be a separate component from the bottom support 24 and may have any suitable configuration without deviating from the overall scope of the subject invention.

The bottom support 24 includes the front aperture 66 in the frontal section with the crotch belt 34 passing upwardly through the front aperture 66. A front slot 76 mates with the front aperture 66 in the frontal section of the bottom support 24 for providing access to the front aperture 66 such that the crotch belt 34 may be installed within the front aperture 66. The crotch belt 34 passes downward through the front aperture 66, underneath the bottom support 24, upward through the opening 72 in the bottom support 24, over the flanges 74, back downward through the opening 72 in the bottom support 24 and underneath the bottom support 24 until mated with the lap belts 32. This design allows for passive crotch buckle positioning as necessary for children users within a nominal range of sizes. In particular, because the front aperture 66 is positioned more forwardly than what is conventional, the crotch belt 34 more comfortably accommodates a wider range of children without the need for adjusting the length of the crotch belt 34. In all cases, the crotch belt 34 should extend at an angle between 45°–90° to the horizontal when the buckle 48 is latched in restraining relation to a child and position the buckle 48 so that the lap belts 32 pass over the child's thighs when the belt arrangement is locked in restraining relation.

The crotch belt 34 acts as an anchor point for the seat belt restraint system. The points at which the upper portions of shoulder belts 30 engage the top apertures 38 may serve as upper anchor points. In addition, the two points at which the lap belts 32 extend through the side slots 44 are considered to constitute two further anchor points. Thus, a five point belt system is provided.

In accordance with the present invention, the belt cloth material forming the five point restraining system is formed into a single, interconnected unit. The interconnected unit of belt material can be appropriately anchored, such as by being passed through the various apertures 38, 42 in the back support 22 and bottom support 24 to form the five-point restraint. Specifically, the front aperture 66 and front slot 76 are similar to the apertures and slots used by the shoulder 30 and lap 32 belts. During the mounting of the belts, each of the shoulder 30, lap 32 and crotch 34 belts are first drawn through the corresponding slots 44, 76. Next, the belts 30, 32, 34 are manually manipulated so as to be disposed within the corresponding apertures 38, 42, 66 where the belts 30, 32, 34 remains during use.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be any way limiting, the invention may be practiced otherwise than as specifically described.

What is claimed is:

1. A child restraint seat assembly comprising;

a back support constructed and arranged to support a torso of a child in a seated posture;

a bottom support pivotally mounted to said back support and moveable between a stowed position and a deployed position for supporting the child in the seated posture when in said deployed position;

a pair of shoulder belts each extending over said back support constructed and arranged to secure the torso of the child to said back support;

a pair of lap belts each extending over said bottom support constructed and arranged to secure a lap region of the child; and a crotch belt integrally connected to said lap belts and extending upwardly from said bottom support for locking engagement with said shoulder belts;

said assembly characterized by a retarding device disposed on said bottom support with said crotch belt engaging said retarding device to limit movement of said crotch belt and said lap belts relative to said bottom support to ensure a proper fitting relationship between said belts and the child.

2. An assembly as set forth in claim 1 wherein said crotch belt loops through said retarding device such that the frictional forces between said crotch belt and said retarding device limit said movement of said crotch belt.

3. An assembly as set forth in claim 2 wherein said retarding device is integral with said bottom support.

4. An assembly as set forth in claim 3 wherein said bottom support has a frontal section and a mid section with an opening disposed in said mid section, said retarding device including a pair of integral flanges extending into said opening with said crotch belt looping around said flanges.

5. An assembly as set forth in claim 4 wherein said bottom support includes a front aperture in said frontal section with said crotch belt passing upwardly through said front aperture.

6. An assembly as set forth in claim 5 further including a front slot mating with said front aperture in said frontal section of said bottom support for providing access to said front aperture such that said crotch belt may be installed within said front aperture.

7. An assembly as set forth in claim 6 wherein said bottom support includes a pair of side apertures with said lap belts passing therethrough.

8. An assembly as set forth in claim 7 further including a pair of side slots mating with said side apertures of said bottom support for providing access to said side apertures such that said lap belts may be installed within said side apertures.

9. An assembly as set forth in claim 1 wherein said back support includes a pair of top apertures with said shoulder belts passing therethrough.

10. An assembly as set forth in claim 9 further including a pair of top slots mating with said top apertures in said back support for providing access to said top apertures such that said shoulder belts may be installed within said top apertures.

11. An assembly as set forth in claim 1 wherein said pair of shoulder belts includes a right shoulder belt and a left shoulder belt and said pair of lap belts includes a right lap belt and a left lap belt, said right shoulder belt and said right lap belt are interconnected to form one continuous right seat belt and said left shoulder belt and said left lap belt are interconnected to form one continuous left seat belt.

12. An assembly as set forth in claim 11 further including a latch mounted to each of said right and left seat belts at an interface of said corresponding shoulder and lap belts.

13. An assembly as set forth in claim 12 further including a buckle disposed on a distal end of said crotch belt for selective engagement with said latches to secure said shoulder and said lap belts to said crotch belt.

14. An assembly as set forth in claim 13 further including a shoulder belt clip mounted to each of said shoulder belts between said latch and said top apertures in said back support for maintaining said shoulder belts in a substantially parallel configuration.

* * * * *